June 21, 1938. R. C. MARHOLZ 2,121,762
RADIO RECEIVER DIAL APPARATUS
Filed Sept. 11, 1936 4 Sheets-Sheet 4
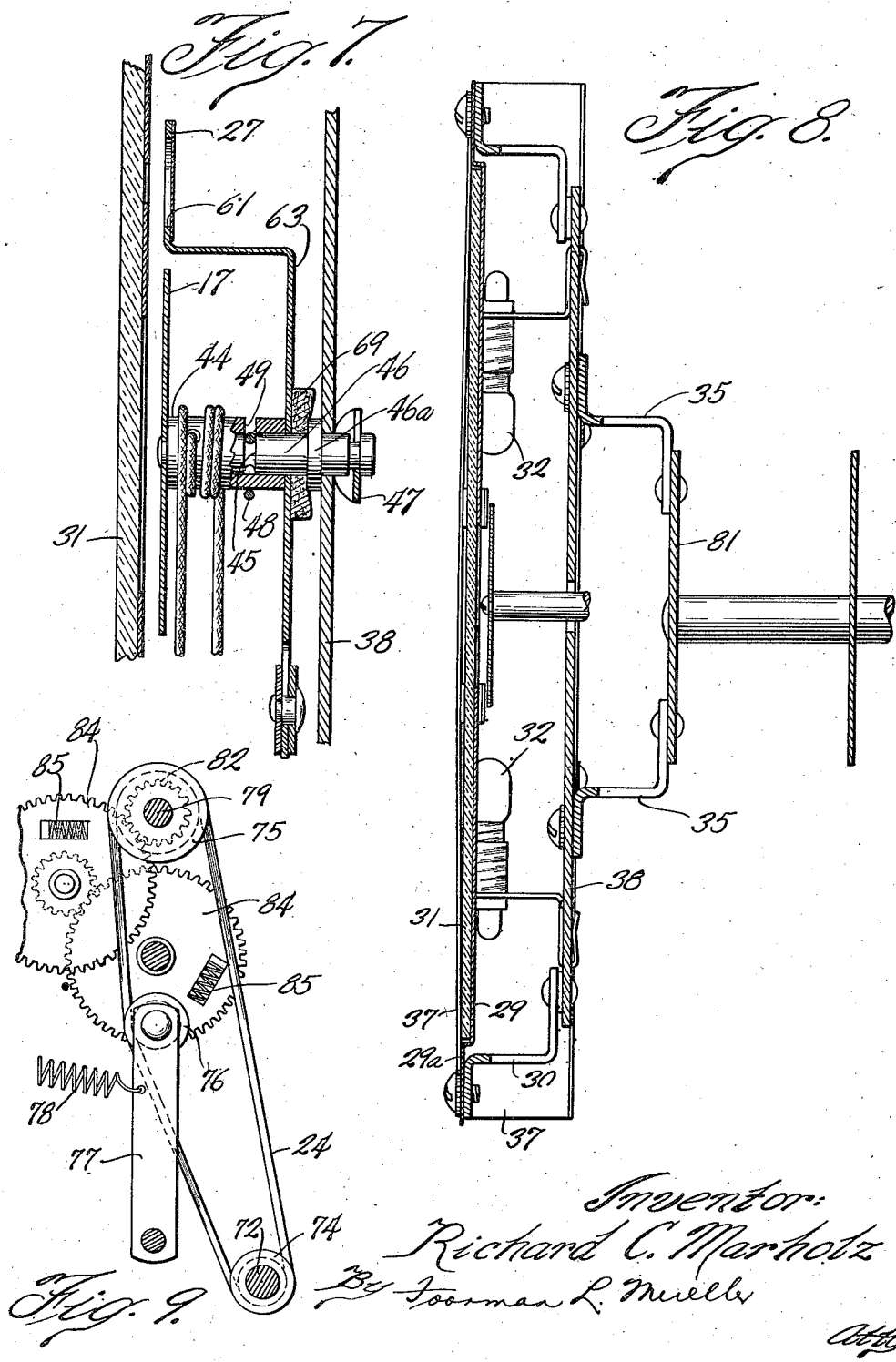

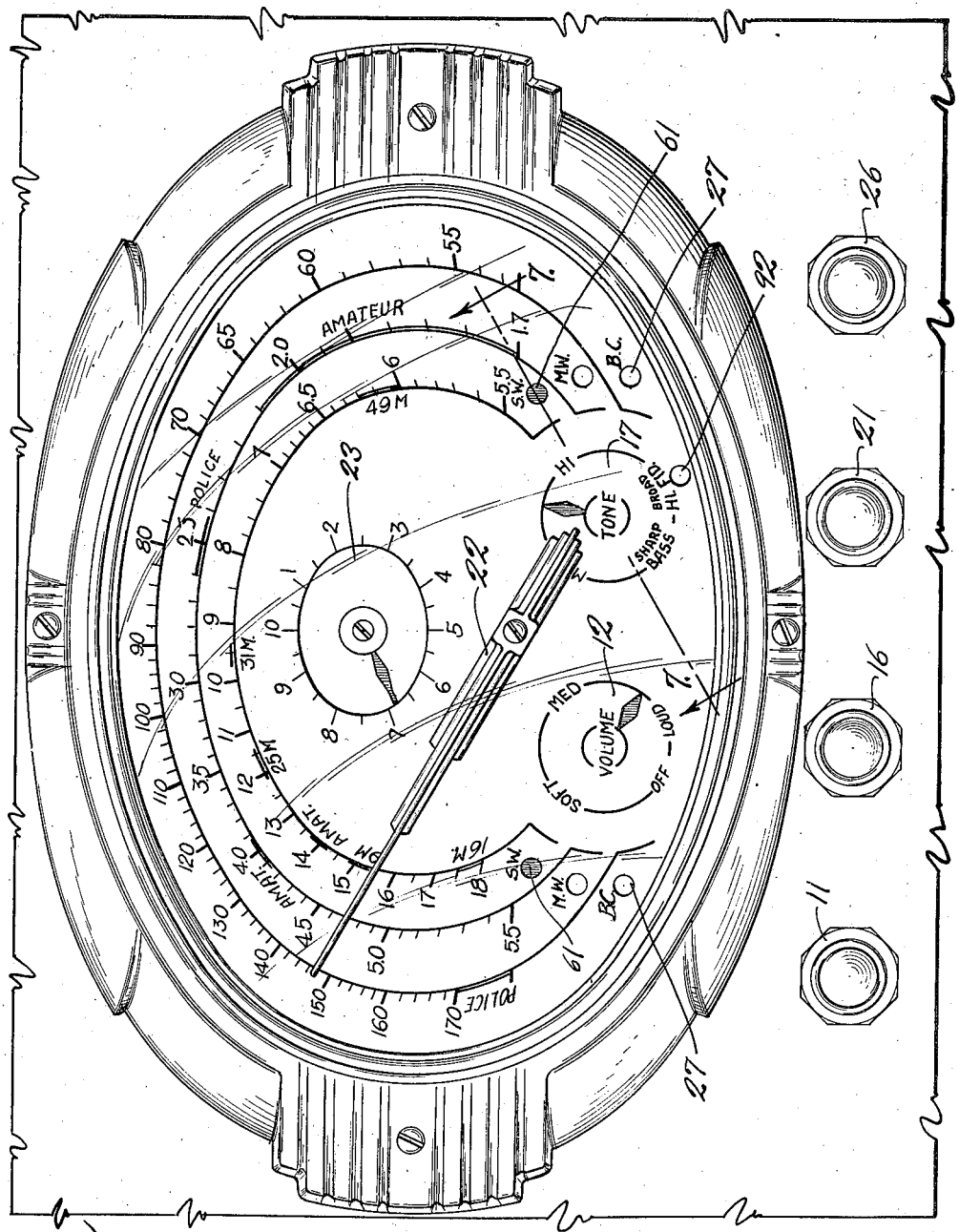

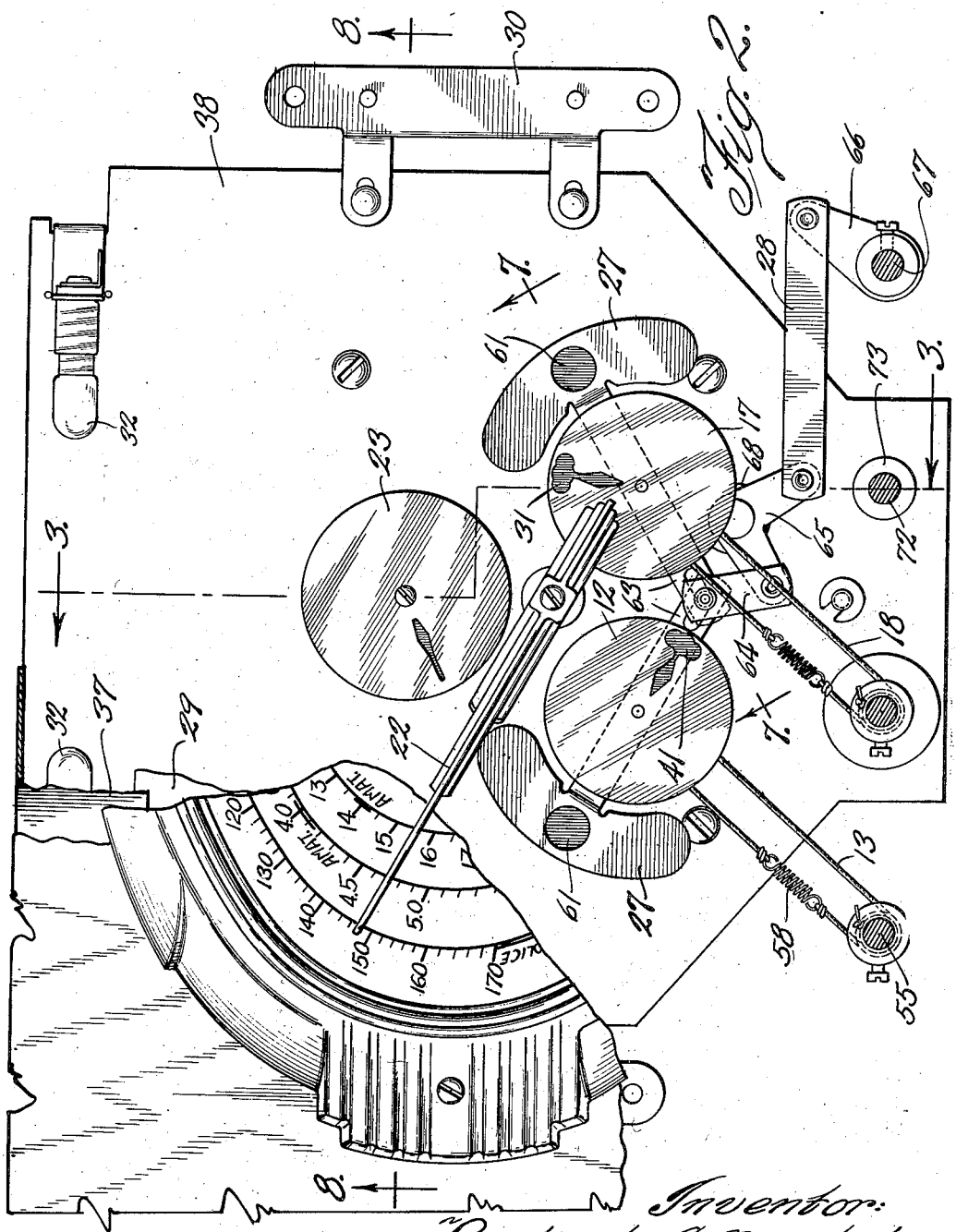

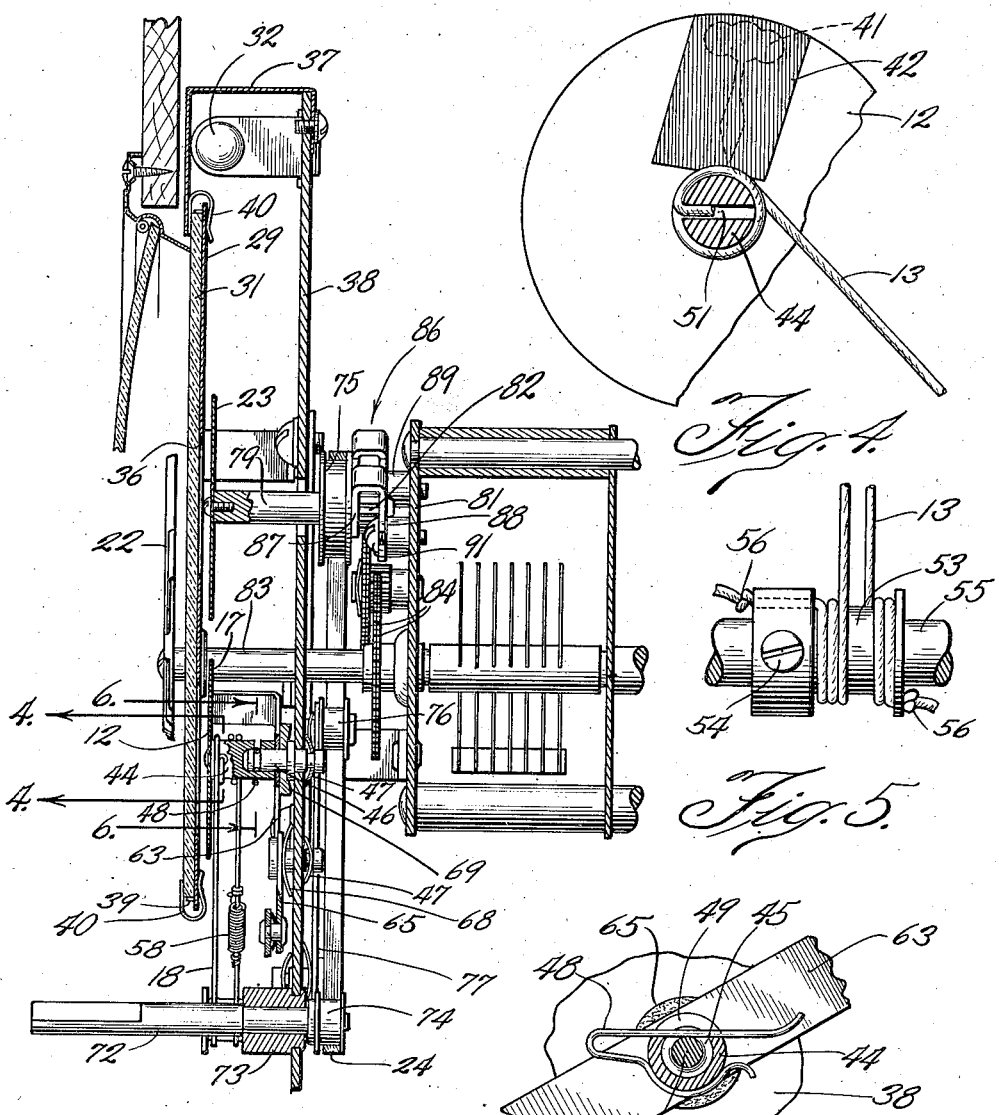

Patented June 21, 1938

2,121,762

UNITED STATES PATENT OFFICE 2,121,762

RADIO RECEIVER DIAL APPARATUS

Richard C. Marholz, Chicago, Ill., assignor to Belmont Radio Corporation, Chicago, Ill., a corporation of Illinois Application September 11, 1936, Serial No. 100,261

26 Claims. (Cl. 116—124.1)

This invention relates to dial apparatus for radio receiving sets and the like, and has been illustrated as embodied in apparatus having various indicators including a main pointer mounted below the center of the dial with three elliptical scales extending thereabove for indicating the tuning of the receiving set, a vernier indicator operating with the main pointer driving mechanism for indicating the tuning more accurately, a pair of shiftable wave band indicators appearing at opposite ends of whichever of the three scales that is being used, a volume indicator, and a tone control indicator.

One object of the invention is to provide a neat dial so arranged as to provide maximum scale length for a pointer moving through 180°. The elliptical scale with an off-center pointer provides the pleasing appearance of an elliptical dial while permitting the use of a longer pointer and greater length of scale and consequent improved legibility than if the pointer were mounted at the center of the dial.

A further object is the provision of a dial having primary indicating scales positioned on the dial in a manner to permit the positioning of all supplementary indicating means within the general outlines of the primary scales, and provide such complete positioning with a pleasing and symmetrical appearance for the dial.

It is also an object of the invention to provide tuning receiver and control indication on a dial providing maximum visibility from the standpoint of legibility and illumination, yet artistically pleasing and mechanically efficient.

Another object of the invention is to provide a dial mechanism furnishing maximum tuning and control indications with a compact and simple construction. To this end some of the indicators are mounted on bushings which serve both as bearings and as hubs for the cables or cords which drive them; and as to the tuning indicators, and wave band indicators, only a single control knob is required for operating the two connected indicators.

Another object of the invention is to provide such a dial mechanism in which the indications are reliable and in which, in spite of the simplicity of the operating mechanism, there is no chance for a creeping effect in the driving cables for the indicating devices which would make the devices become increasingly inaccurate. The cables are passed through holes in the drive pulleys and are drawn taut by springs.

Still another object is to provide the combination of an edge illuminated dial with moving illuminated indicators behind it.

A further object of the invention is to provide a simplified mounting for the dial and a light reflector which will insure proper illumination for the dial.

Additional objects will be apparent from the following description and from the drawings, in which:

Fig. 1 is a front elevational view of the dial apparatus chosen for illustration in the dimensions of a commercial embodiment.

Fig. 2 is a view similar to Fig. 1, but with the major portion of the dial broken away to provide a full view of the indicators and part of the operating mechanism therefor.

Fig. 3 is a vertical sectional view taken substantially along the line 3—3 of Fig. 2.

Fig. 4 is a fragmentary detail taken substantially along the line 4—4 of Fig. 3.

Fig. 5 is a fragmentary detail showing the mounting of a cord on a control knob.

Fig. 6 is a fragmentary view substantially along the line 6—6 of Fig. 3.

Fig. 7 is a fragmentary view approximately along the line 7—7 of Fig. 2.

Fig. 8 is a horizontal sectional view substantially along the line 8—8 of Fig. 2; and Fig. 9 is a substantially schematic view of a portion of the operating mechanism for the primary pointer, and the vernier indicator.

Although this invention may take numerous forms, only one form has been chosen for illustration. In this form, four control knobs have been shown. One is a volume control knob 11 which also turns the set on and off and operates an indicator 12 through a cable or cord 13. Another is the tone control knob 16 which, besides its tone-control function, operates the tone control indicator 17 by cord 18. A third is the station selector knob 21 which operates gang condensers and also the main pointer 22 and the vernier indicator 23 by means of a belt 24, seen in Fig. 3. The fourth control knob 26 is a band selector for switching the set from one band of wave lengths to a band of longer or shorter wave lengths. It operates the twin shiftable indicators 27 through the linkage mechanism of which link 28 is the first element.

This mechanism has been illustrated in connection with an edge illuminated dial, which should be described for the sake of clarity, although in many of its aspects the invention could be used with any other type of dial. A backing plate 29 of shallow channel shape, as seen in Fig 8, is supported by brackets 30 secured to main support plate 38 which latter is in turn supported from the front plate of the gang condenser by brackets 35. The dial proper comprises a plate glass 31 set into the channel of plate 29 and having the scales and various other indicia, as seen in Fig. 1, applied thereto, preferably by being etched into the surface of the glass, the indentations being filled with a suitable paint. Whether indented or not, the paint should be of a bright color such as gold or white which will reflect a large amount of light. Substantially alined with the glass dial 31 are a pair of lamps 32 which throw light directly into the edge of the glass with the result that it illuminates the etched indicia though this light entering the edge of the glass is practically invisible otherwise. The backing plate 29 is usually black and is opaque so as to shut off any back light from the dial, except at the positions of the various translucent indicators where various holes 36 are provided. These holes are blocked off by the indicators except for the translucent portion of the indicator. The back plate 38 reflects enough light from the bulbs 32 to illuminate the translucent portions of the indicators. A reflector 37 of any bright metal is secured to both the support plate 38 and the sides 29a of the backing plate 29. Because the front wall of the reflector is quite close to the front of the dial 31 (Fig. 3), glare on the front of the dial is prevented. The dial may rest on an outwardly turned lug 39 from the plate 29 and be held in place by spring clips 40, as seen best in Fig. 3.

The construction and operation of the indicators 12 and 17 are substantially identical and therefore may be described with reference to the indicator 12 only. The indicators 12 comprise an opaque disc having a translucent portion 41 which may conveniently be formed by a window through the disc covered on the back side by a strip 42 of translucent colored paper or similar material, as seen in Fig. 4. The disc 12 (or 17) has a bushing 44 staked thereto, which in turn is rotatably mounted on a stud 46 which is secured to the support plate 38 in any suitable manner, as by a spring washer 47 and integral flange 46a on the stud. The stud 46 is grooved near its outer end, and bushing 44 is secured thereon by a wire clip 48 which, as seen best in Fig. 6, extends through a slot 49 in the hub 44 and engages the groove 45 in the stud 46. The outer side of the groove is radial to prevent the clip from being sprung off accidentally. This construction permits the indicator discs, such as the discs 12 or 17, to rotate easily on the stud 46. The parts may be designed so that the active arm of clip 48 will strike the seat of slot 49 before it strikes the seat of slot 45, so that it will not increase the friction any more than is necessary to hold the hub 44 in place. The other arm of clip 48 is shaped to engage the bushing 44 as seen in Fig. 6.

The disc 12 is rotated by means of cable or cord 13 which for the sake of permanent accuracy is passed through a hole 51 in the hub 44 (Fig. 4) and wrapped around the bushing in opposite directions. The ends of the cord are wrapped around a pulley 53 secured by a set screw 54 to a control shaft 55, on which the associated control knob 11 is mounted. The ends of the cord 13 may then be secured to the flanges of the bushing 53, as illustrated at 56, the cord being passed through a hole in the bushing and knotted. A coil spring 58 is preferably secured in one stretch of the cord 13 to maintain the cord taut so that there will not be any backlash or play between the control knob and the indicator disc operated thereby. The same construction is provided for the tone control indicator actuated by the knob 16.

The wave band indicators 27 are each in the form of an arcuate shaped opaque member having a translucent window 61 thereon. Each of these indicators 27 is mounted on an integral arm 63, each arm being pivoted on one of the studs 46, as seen best in Figs. 6 and 7. As seen in Fig. 2, the arms 63 are slotted at their inner ends and connected by a link 64 to a pivoted bell crank lever 65, which in turn is connected to link 28, and by a stud to crank arm 66 rigidly mounted on shaft 67 on which is also mounted the band selector knob 26. It is evident that, as the knob 26 and its shaft 67 are rotated to rotate and operate the band selector switch (not shown), the band indicators 27 will be shifted through the linkage system just described to place the translucent window 61 immediately behind some one pair of the apertures adjacent the particular scale for the band which is in use. Resilient washers, such as the metal washer 68 under crank 65 and felt washers 69 under arms 63 are provided to prevent rattling.

As to the drive for the tuning control, the tuning knob 21 is mounted on shaft 72 journalled in bushing 73 which is secured to the support plate 38, as shown in Fig. 3. The shaft 72 carries a pulley 74 keyed thereto, which drives the belt 24 extending around a pulley 75 and tightened by a spring drawn tightener 76 mounted on a pivoted arm 77 and pulled outwardly by the spring 78 (Fig. 9). The pulley 75 is keyed to a shaft 79 which may be rotatably supported from the front plate 81 of the tuning condenser unit. A pinion 82 is also keyed to the shaft 79 and drives the tuning shaft 83 through one or more gears 84. Each of these gears is a split gear with the two halves drawn circumferentially in opposite directions by a spring 85 so that there will be no play or backlash in the gear drive. The shaft 79 and pinion 82 secured thereto are journalled in a U-shaped bracket 86 having a pair of legs 87 and 88 and mounted on the plate 81 of the condenser and spaced away therefrom by studs 89. Bolts 91 extending through holes in the leg 88, the studs 89, and screwed into the plate 81, secure the bracket.

The indicator disc 23 is of the same character as the indicator discs 12 and 17, although its mounting is different, as seen in Fig. 3. It should be noted that one or all of these discs may have different configurations of the translucent window. Thus, on the disc 17 the translucent window includes not only the arrow portion visible in Fig. 1, but also an enlarged outer portion visible in Fig. 2, which is positioned to appear behind a special hole 92 when the disc is in a certain position, this position in the illustrated form being adjacent the highest portion of the tone control scale, at which point a switch operates to change the selectivity characteristics of the set from sharp to broad.

One important feature of the present invention is the eccentric relation between the main pointer 22 and the scale, or the dial as a whole. It will be noted that the scale is elliptical in arrangement and that an elliptical portion of the dial is exposed by the escutcheon 88. This is a very attractive and popular shape, but following the prior practice of mounting a pointer at the center of the scale would subject the assembly to various disadvantages. With the pointer centered with respect to the dial, or, in other words, with the dial so positioned that the major axis of the ellipse passed through the rotational axis of the condenser shaft and the pointer attached thereto, the result would be that, if the pointer were long enough to reach the farthest portions of the scale, it extended considerably beyond the nearest portions of the scale. According to the present invention, the pointer is pivoted decidedly below the major axis of the ellipse with the result that that point on the scale on the major axis of the ellipse is only slightly farther from the pivotal point of the pointer than is that portion of the scale on the minor axis of the ellipse. It follows that, if the pointer is just long enough to reach the farthest point of the scale, it will project only slightly beyond the closest point of the scale, bearing in mind of course that the pointer makes only one-half of a revolution. This arrangement also has the important advantage of lengthening the scale so as to make it more easily read.

Another advantage of this arrangement is in providing a convenient space above the pointer for the vernier indicator. It is readily seen from Fig. 1 that if the pointer were pivoted on the major axis of the ellipse the vernier indicator thereabove would have to be considerably smaller or else it would have to run into the main scale indications, providing the vernier scale, and the primary scales, more toward the top of the dial has made it possible to obtain satisfactory illumination with a simplified lighting structure at the top edge of the dial plate.

The operation of the dial apparatus will probably be evident from the foregoing description and from the drawings, but may be briefly reviewed for the sake of clarity. In turning the set on, the user will turn the left hand control knob 11, which will turn indicator disc 12 by means of the cord 13. The user will turn this knob until the position of the arrow on the indicator disc is such that the volume of the set will be that which he desires when the tubes have heated up sufficiently to be operative. The user may next turn the station selector knob 21, which, through belt 24, will turn the main pointer 22 and the vernier indicator 23 until the station desired has been selected. It may be assumed that the wave band switch is already set for the desired band of wave lengths, as indicated by the translucent portion 61 of the indicator 27, but, if not, the knob 26 will be turned until this translucent portion shows through the small opening adjacent the scale of the wave band desired. Unless the indicator 17 shows that the tone control is set as desired, the user may turn the control knob 16 to adjust the set for the desired tone even before the operation of the set begins.

From the foregoing, it is seen that it is possible for the operator of the set to pre-adjust it perfectly so as to have the reproduction start with the desired station, the desired volume and the desired tone. Furthermore, the character of the mechanism is such that in spite of its simplicity, absolute accuracy and freedom from backlash is assured.

The disclosures of this application are illustrative and the invention is not to be limited by them. In fact, if modifications or improvements are not at once obvious, they may be devised in the course of time to make additional use of the broad ideas taught and covered by this application. The claims are intended to point out novel features and not to limit the invention except as may be required by prior art.

I claim:

1. Dial apparatus for a radio set or the like including a main tuning indication pointer movable through not more than approximately 180 degrees, and a dial having elliptically arranged calibrations thereon, the long axis of the ellipse being positioned above the rotational axis of the pointer but said elliptically arranged calibrations extending to each side of the rotational axis of the pointer and terminating on a longitudinal line substantially through said rotational axis.

2. Dial apparatus for a radio set or the like including a main tuning indication pointer movable through not more than approximately 180 degrees, and a dial having calibrations thereon elliptically arranged around the rotational axis of the pointer, with the long axis of such ellipse being positioned above said rotational axis, and said rotational axis being at such a position on the dial within said elliptically arranged calibrations that the portion of the calibrations on the short axis of the ellipse defined by said calibrations is almost as far from the rotational axis of the pointer as is the portion of the calibrations on the long axis of the ellipse.

3. Dial apparatus for a radio set or the like, including a main tuning indication pointer movable through not more than approximately 180 degrees, and a dial having calibrations thereon elliptically arranged around the rotational axis of the pointer, with the long axis of such ellipse being positioned above said rotational axis, and said rotational axis being at such a position on the dial within said elliptically arranged calibrations that the portion of the calibrations on the short axis of the ellipse defined by said calibrations is almost as far from the rotational axis of the pointer as is the portion of the calibrations on the long axis of the ellipse, and illuminating means adjacent the upper portion of said dial, whereby the light is somewhat concentrated on the calibrations which, arranged in said ellipse, provide an elongated calibrated tuning scale.

4. Dial apparatus for a radio set or the like including a main tuning indication pointer movable through not more than approximately 180 degrees, a dial having elliptically arranged calibrations thereon, the long axis of the ellipse being positioned above the rotational axis of the pointer, and a vernier indicator positioned between the rotational axis of the pointer and the portion of the scale on the short axis of the ellipse and cooperating driving means mounted behind said dial for simultaneously driving said pointer and said vernier indicator.

5. Radio dial apparatus including a dial, an escutcheon plate exposing a portion of said dial of generally elliptical shape, a pointer rotatably mounted well below the center of the exposed portion of said dial and having a length such that it will reach approximately to the top of said exposed portion and elliptically arranged calibrations on said dial extending from a point to each of two sides of the rotational mounting point of the pointer and substantially on a line through said mounting point to a point adjacent the top of the exposed portion.

6. Dial apparatus for a radio set or the like for indicating the controlled condition thereof, including a dial having elliptically arranged calibrations thereon, as a tuning scale, a plurality of indicating means, comprising a main tuning indication pointer movable through not more than approximately 180 degrees with the long axis of the ellipse of the calibrations being positioned above the rotational axis of the pointer, a vernier indicator positioned between the rotational axis of the pointer and the portion of the scale on the short axis of the ellipse, and an additional indicator on the dial below the level of the rotational axis of the pointer, and cooperating electrical and mechanical means for operating all of said indicating means with relation to one another for complete indication of the operating condition of the radio set.

7. Radio dial apparatus including a support member, a stud secured to said support member, a cap rotatably and removably carried by said stud, an indicator secured to the end of said cap, and a dial close to said indicator.

8. Radio dial apparatus including a support member, a stud secured to said support member, an indicator mounted on a bushing, said bushing being rotatably mounted on said stud, and a clip extending through a slot on one side of said bushing and extending therethrough into an annular slot on said stud for retaining said bushing on said stud while permitting its free rotation thereon.

9. Radio dial apparatus including a support member, a stud secured to said support member, an indicator mounted on a bushing, said bushing being rotatably mounted on said stud, and a clip extending through a slot on one side of said bushing and extending therethrough into an annular slot on said stud for retaining said bushing on said stud while permitting its free rotation thereon; said slot and said groove being of such relative sizes that said clip engages the seat of said slot before engaging the seat of said groove, whereby friction of said clip seating on said stud is eliminated.

10. Dial mechanism including a control shaft, an indicator spaced therefrom and mounted on a suitable hub, and means for rotating said indicator accurately in response to rotation of said control shaft comprising a cord wrapped around said hub and said shaft, and a spring for tightening said cord; permanence of relationship between said parts being assured by passing said cord through a hole in each of said members, the cord being wrapped around said members in both directions away from said holes to permit proper driving operation.

11. Radio dial apparatus including a support member, a stud secured to said support member, an indicator mounted at one end of an elongated bushing; the free end of said bushing being telescoped over and rotatable on said stud, and means for rotating said bushing and indicator comprising a belt wrapped around said bushing approximately at the position of its engagement with said stud.

12. Radio dial apparatus including a support member, a stud secured to said support member, an indicator mounted at one end of an elongated bushing, the free end of said bushing being telescoped over and rotatable on said stud, means for rotating said bushing and indicator comprising a belt wrapped around said bushing approximately at the position of its engagement with said stud, a lever pivoted on said stud beneath said bushing, and an additional indicator on said lever.

13. Dial mechanism including a control shaft, an indicator spaced therefrom and mounted on a suitable hub, means for rotating said indicator accurately in response to rotation of said control shaft comprising a cord wrapped around said hub and said shaft, and a spring for tightening said cord, and an additional indicator pivotally carried by said stud, and means for shifting said indicator independently of said first named indicator to provide an independent indication.

14. Dial apparatus including a dial having a plurality of elongated scales for optional use, each of said scales being provided in a path extending in other than a straight line around the dial, indicator portions on said dial in the path of each of said scales, lighting means to the rear of the dial, an indicator means movable to the rear of said dial acting with said lighting means for providing visual indications at said indicator portions in a scale path to indicate which said scale is being used.

15. Dial apparatus including a dial having a plurality of elongated scales for optional use, and means for providing visual indications at opposite ends of whichever scale is being used, comprising a pair of pivoted indicators having intersecting arms, at least one of said arms being slotted at the point of intersection, a pin passing through said slot and through the other arm, and means for moving said pin in a direction approximately perpendicular to a line between the axes of said indicators to move both of said indicators simultaneously and approximately equally.

16. An edge illuminated dial unit including a marked dial, a lamp bulb positioned to throw light into the edge of said dial, a channel shaped backing plate having said dial inserted into and neatly fitting the channel thereof, a support plate for said backing plate, and a reflector adjacent said lamps and secured to both said backing plate and said support plate.

17. An edge illuminated dial unit including a marked dial, a lamp bulb positioned to throw light into the edge of said dial, a channel-shaped backing plate having said dial inserted into and neatly fitting the channel thereof, a reflecting support plate spaced behind said backing plate and supporting it and arranged to receive light from said lamp bulbs, said backing plate being provided with indicator openings, and rotative indicators adjacent said openings being of an opaque nature with a translucent indicator portion which moves in said opening to provide the combination of edge illumination and rear illuminated shifting indicator.

18. A dial apparatus for a radio receiving set adjustable to receive signals on a plurality of bands of wave lengths with the same main dial settings, including a translucent dial and an indicator movable with respect thereto, illuminating means providing illumination at the rear of said dial, said dial having a plurality of lines of calibrations along which said indicator moves simultaneously, and means for indicating which of said lines of calibrations should be read for the particular adjustment of the set, including means movable to the rear of said dial to a position to permit, in cooperation with said dial, light to shine through said means and said dial for providing a visible indication at the front of said dial in alinement with the line to be read.

19. Dial apparatus for a radio set or the like, including an indicating pointer rotatably mounted and movable in conjunction with the tuning condenser of the radio set, a dial having calibrations thereon arranged in an elliptical path which in a continuous line would surround the mounting point of the pointer, but with the long axis of the ellipse being positioned above the mounting point of the pointer, and a plurality of radio set control indicators in conjunction with said dial and visible thereon in positions all substantially within the confines of the elliptical path including the indicating calibrations.

20. In control and indicating apparatus for a multi-wave band radio receiver including a dial having a plurality of groups of calibrations thereon, with each group corresponding to a single wave band length, an indicating pointer movable over all of said groups of calibrations, a wave band switch for adjusting the radio receiver for reception on any desired wave band, and means for indicating which of said groups of calibrations is being utilized by said pointer to indicate the tuned position of the radio receiver, said means including an indicating member pivoted to the rear of said dial, driving means for said member movably connected to said member in an off-center manner to provide an eccentric movement thereof, with said driving means acting in conjunction with said wave band switch to indicate the adjusted position of the switch and consequently the group of calibrations to be read for tuning indication of the radio receiver.

21. A dial apparatus for a radio receiving set adjustable to receive signals on a plurality of bands of wave lengths, including a stationary dial having at least one transparent portion thereon and having a plurality of lines of calibrations thereon, with each line corresponding to a single wave length band, an indicator movable simultaneously over all of said plurality of lines of calibrations, illuminting means for said apparatus providing illumination at the rear of the dial for shining through said dial, and apertured means operable to the rear of the dial for selective movement to bring an aperture thereof into alinement with a corresponding transparent portion in the dial to permit light to shine through each, to be visible in front of the dial for visible indication of the line of calibrations to be read.

22. A dial apparatus for a radio receiving set adjustable to receive signals on a plurality of bands of wave lengths, including a stationary dial having a plurality of lines of calibrations thereon, with each line corresponding to a single wave length band, an indicator movable simultaneously over all of said plurality of lines of calibrations, illuminating means to provide illumination at the rear of the dial adjustable in connection with wave band selecting means for the radio, having a portion permitting light to shine therethrough, for selective movement to bring said portion into alinement with a corresponding portion on said dial to permit light to shine through said portions and be visible in front of said dial to indicate the single line of calibrations to be read for a particular tuning operation of the radio receiving set.

23. In control and indicating apparatus for a multi-wave band radio receiver, tuning means for the receiver, a dial assembly, switching means for selectively connecting the tuning means for radio reception on a particular wave band, and means for indicating the particular wave band upon which the receiver is being tuned, said latter means including a rotatively movable indicator pivoted behind the dial and having a portion visible through a viewing portion of the dial assembly, and means from the switching means eccentrically connected to the pivoted indicator to move said indicator in accordance with the movement of said switching means.

24. In control and indicating apparatus for a multi-wave band radio receiver, a dial assembly including a plurality of tuning scale indications corresponding to the number of wave bands upon which the receiver may be tuned and dial illuminating means, a wave band switch for selecting the particular wave band for radio reception, and indicating means cooperating with said wave band switch for indicating the particular scale being utilized for tuning, including an apertured indicator pivoted behind the dial with translucent colored material over the aperture, and connecting means from said wave band switch to said indicating means to move the latter upon movement of the switch to bring the covered aperture into alinement with a corresponding wave band indication viewing aperture in the dial assembly, whereby the illuminating means illuminates the colored material to make the coloring visible through the dial assembly aperture to indicate the particular tuning scale being utilized in the operation of the radio receiver.

25. Apparatus for controlling the tuning of a radio receiver and indicating the tuned position thereof, including a dial having a plurality of tuning scales thereon, with each scale for a different radio signal wave band and viewing spaces through said dial with a space for each tuning scale; an indicator movable over the front of said dial to indicate on a single scale the tuned position of said radio receiver, an apertured indicating member carried behind said dial and movable to bring said aperture into alignment with a viewing space, and a lamp mounted to project a beam through said aperture to be visible in front of said dial through the viewing space to indicate the scale being utilized for tuning indication for the receiver.

26. Radio control indicating apparatus including a member having indicating indicia thereon, means movable behind said member to indicate thereon controlled positions of said radio, a single actuating means for said movable means, said movable means including a plurality of pivoted members each having a different pivot point, with said actuating means rotatably supported off center with respect to at least one of said members, and pivoted lever connecting means from said single actuating means eccentrically connected to said pivoted members to simultaneously move each of said pivoted members in accordance with the movement of said single actuating means.

RICHARD C. MARHOLZ.